(No Model.) 2 Sheets—Sheet 1.

D. L. BLACKBURN.
STALL FOR COWS.

No. 516,466. Patented Mar. 13, 1894.

Witnesses
Harry L. Amer.
N. J. Riley

Inventor
David L. Blackburn.
By his Attorneys,
C. A. Snow & Co.

THE NATIONAL LITHOGRAPHING COMPANY,
WASHINGTON, D. C.

(No Model.) 2 Sheets—Sheet 2.
D. L. BLACKBURN.
STALL FOR COWS.
No. 516,466. Patented Mar. 13, 1894.
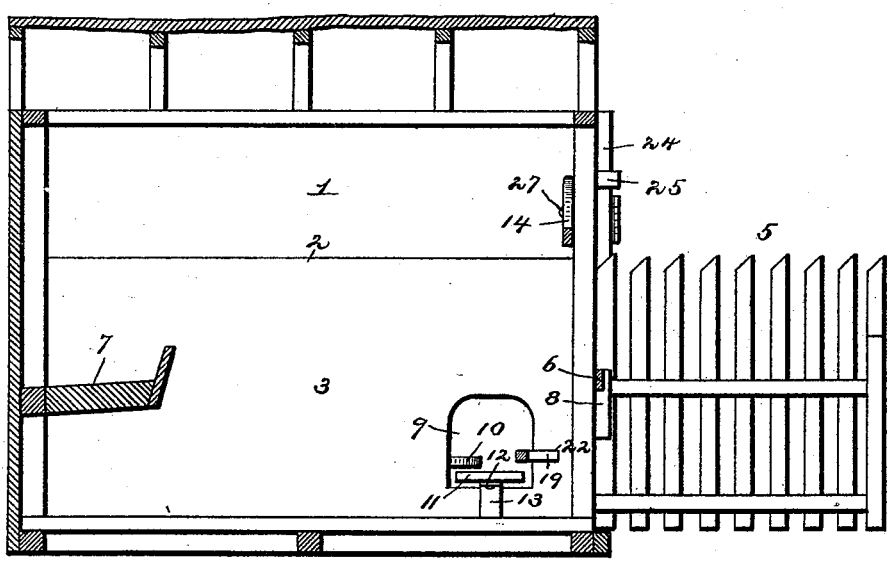
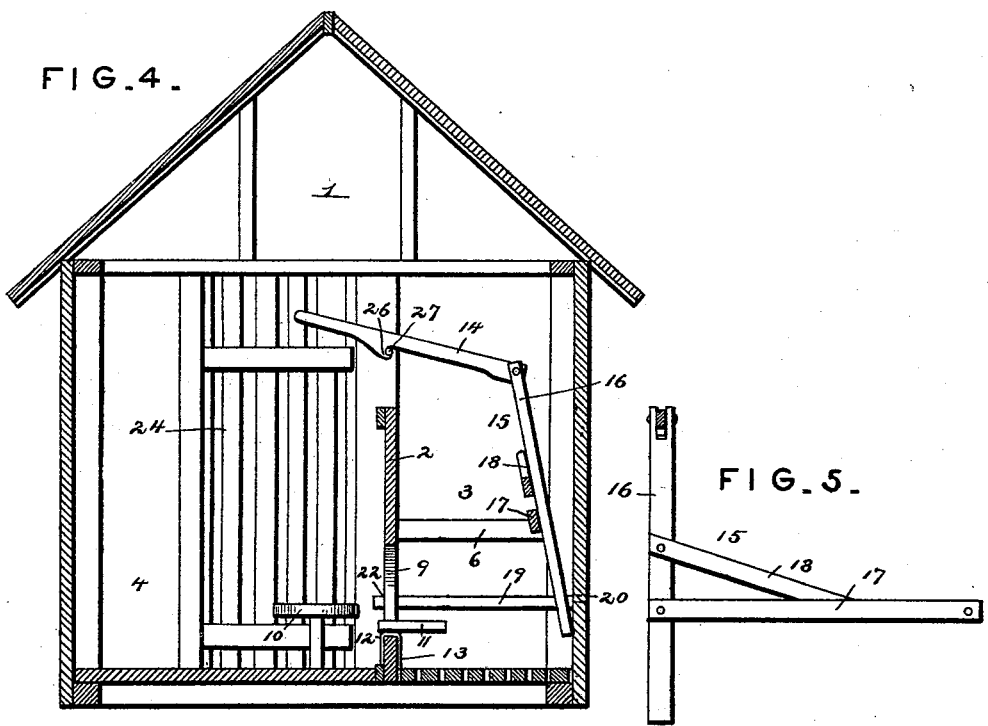
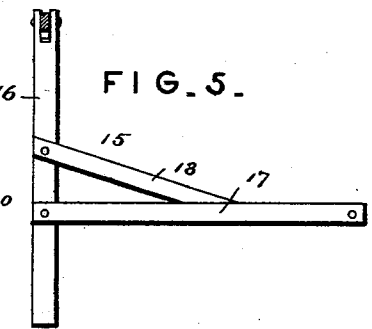
Witnesses
Harry L. Ames.
N. J. Riley
Inventor
David L. Blackburn.
By his Attorneys.
C. A. Snow & Co.

UNITED STATES PATENT OFFICE.

DAVID LUTHER BLACKBURN, OF REIDSVILLE, NORTH CAROLINA.

STALL FOR COWS.

SPECIFICATION forming part of Letters Patent No. 516,466, dated March 13, 1894.

Application filed August 3, 1893. Serial No. 482,291. (No model.)

*To all whom it may concern:*

Be it known that I, DAVID LUTHER BLACKBURN, a citizen of the United States, residing at Reidsville, in the county of Rockingham and State of North Carolina, have invented a new and useful Stall for Stabling Cows to be Milked, of which the following is a specification.

The invention relates to improvements in stalls for stabling cows to be milked.

The object of the present invention is to provide means, whereby a cow may be held in complete control during milking to prevent inconvenience to the operator, and to prevent the milk pail from upsetting.

The invention consists in the construction and novel combination and arrangement of parts hereinafter fully described, illustrated in the accompanying drawings and pointed out in the claims hereto appended.

Figure 1:
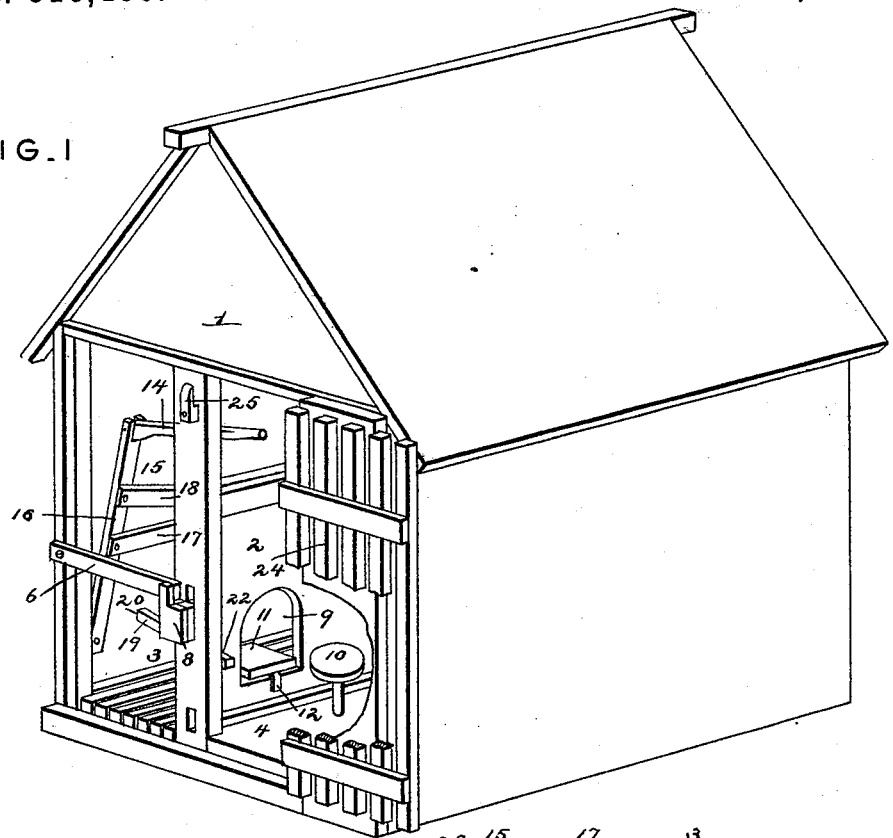
Figure 2:
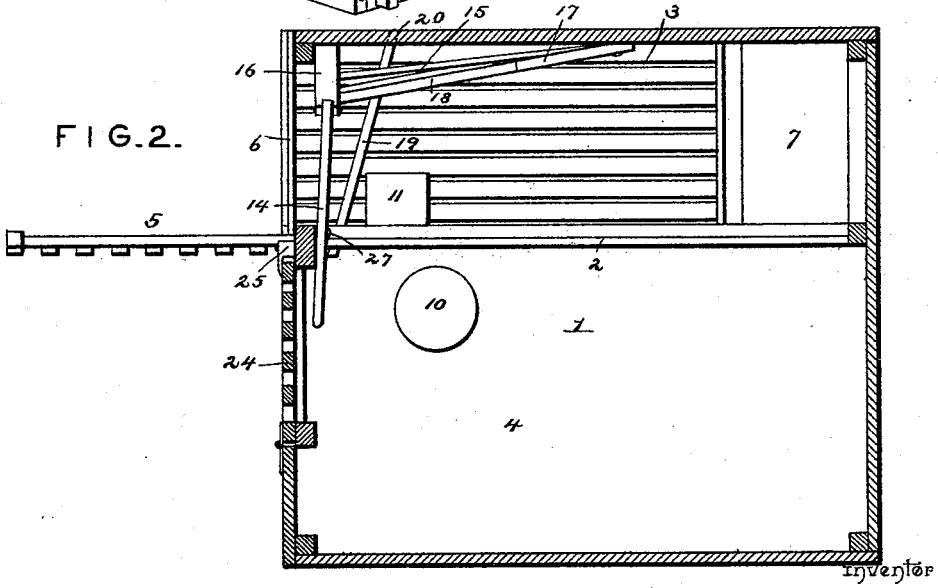

In the drawings—Figure 1 is a perspective view of a stable constructed in accordance with this invention. Fig. 2 is a horizontal sectional view of the same, showing its relation to a fence. Fig. 3 is a longitudinal sectional view. Fig. 4 is a transverse sectional view. Fig. 5 is a detail view of the T-shaped frame.

Like numerals of reference indicate corresponding parts in all the figures of the drawings.

1 designates a stable or structure having a vertical longitudinal partition 2, which forms a stall 3 and an adjacent compartment 4. The stable or structure is arranged in relation to a fence 5, which is on a line with the partition 2, as shown, in order that the stall, which is closed by a pivoted bar 6, may communicate with one field or lot, and the compartment 4 may communicate with another so that cows to be milked will have access to the stall 3, but not to the adjacent compartment 4. At the head of the stall is arranged a feed box or trough 7 in order that a cow may feed while being milked, for if such is the case they will readily learn to enter the stall as soon as access is afforded them by raising the locking bar 6 from a keeper 8. The partition 2, which is of such a height as so enable the operator to readily reach over it for supplying feed to the trough 7, is provided near the bottom with an opening 9 for affording a side approach to the cow to be milked. A stool or seat 10 is arranged in the compartment 4 adjacent to the opening 9 for the convenience of the operator; and a removable shelf or milk pail support 11 is arranged at the opening 9, and extends inward into the stall. The milk pail support or shelf is provided with a depending rectangular clip 12 having an open lower end and engaging the partition at the bottom of the opening and having its side 13 extended to increase the supporting power. The extended side 13 of the rectangular clip of the milk pail support or shelf is arranged in the stall beneath the projecting portion of the shelf or support. The cow being milked is drawn close to the partition 2 and the opening thereof at the will of the operator by a horizontal operating bar 14, and an approximately T-shaped frame 15, which is secured at its lower side to the wall of the stable forming the outer side of the stall, and which has the said operating bar pivotally connected to its upper side, whereby it may be drawn inward to force the cow in the direction of the partition 2. The T-shaped frame is composed of a substantially vertical bar 16; a horizontal bar 17, which is secured at its front end to the vertical bar 16 and an inclined brace 18; it is secured to the stable at the lower end of the vertical bar and the rear or inner end of the horizontal bar; and it possesses sufficient resiliency to enable it to be sprung outward to hold a cow against the partition 2 so that the animal will be within easy reach of the operator.

The cow is prevented from kicking and upsetting a milk pail by a detachable transverse bar 19, which is arranged at an angle to the length of the stall and is designed to be located in advance of the hind legs of the cow. One end of the transverse bar 19 is reduced to form a tenon and is removably fitted in an opening or socket 20 of the stable, and the other end of the bar is arranged in an opening 21 of the partition 2. The operating bar of the inwardly swinging frame is provided at its end adjacent to the compartment with a shoulder 26 to engage a pin or projection 27 to hold the frame against a cow. This end of the operating bar is shaped into a handle for convenience of the operator. The entrance to the compartment 4 may be closed by a hinged door 24 and a pivoted button 25 to prevent any animal gaining access to the compartment.

It will readily be apparent that the stable is simple and comparatively inexpensive in construction, that it affords complete control of a cow, that it prevents the operator from being whipped by the tail of the animal, and that the milk pail is not liable to be upset. It will also be noticed that the stall is sufficiently narrow to prevent a cow from throwing its feed about and wasting the same or getting some of it into the milk pail. It will also be apparent that the operator is provided with a clean compartment, which may be kept perfectly free from dirt.

Changes in the form, proportion and the minor details of construction may be resorted to without departing from the principle or sacrificing any of the advantages of this invention.

What I claim is—

1. The combination of a stall provided at one side with an opening for affording a side approach to a cow, means for holding a cow against the side of the stall having said opening, and a milk pail support arranged at the bottom of said opening and mounted on the adjacent side of the stall and extending into the latter, substantially as described.

2. The combination of a stall provided at one side with an opening for affording a side approach to a cow, an inwardly swinging resilient frame constructed of wood and arranged in advance of the manger of the stall and having its inner end rigidly secured to one side of the stall and provided at its outer end with a cross-bar having its lower end secured to the stall, and means for operating the resilient swinging frame, substantially as described.

3. The combination of a stall provided at one side with an opening for affording a side approach to a cow, an inwardly swinging approximately T-shaped frame mounted on the opposite side of the stall and composed of an approximately vertical bar and a horizontal bar and secured at the lower end of the former and the inner or rear end of the latter, and an operating bar connected to the upper end of the vertical bar, substantially as described.

4. The combination of a stall provided at one side with an opening for affording a side approach to a cow, means for forcing a cow against the side having the opening, and a detachable transverse bar having one end arranged in an opening of one side of the stall and provided at its other end with a tenon fitted in a socket of the other side of a stall, substantially as described.

In testimony that I claim the foregoing as my own I have hereto affixed my signature in the presence of two witnesses.

DAVID LUTHER BLACKBURN.

Witnesses:
N. K. SMITH,
GEO. D. BOYD.